(12) United States Patent
Lee et al.

(10) Patent No.: US 11,006,006 B2
(45) Date of Patent: May 11, 2021

(54) FACSIMILE MACHINE INCLUDING MODEM UNIT AND LINE INTERFACE UNIT AND SELF DIAGNOSIS METHOD PERFORMED BY THE SAME

(71) Applicant: Hewlett-Packard Development Company, L.P., Spring, TX (US)

(72) Inventors: Jeong Baek Lee, Seongnam-si (KR); Chang Min Han, Seongnam-si (KR)

(73) Assignee: Hewlett-Packard Development Company, L.P., Spring, TX (US)

(*) Notice: Subject to any disclaimer, the term of this patent is extended or adjusted under 35 U.S.C. 154(b) by 0 days.

(21) Appl. No.: 16/617,202

(22) PCT Filed: Jul. 4, 2018

(86) PCT No.: PCT/KR2018/007532
§ 371 (c)(1),
(2) Date: Nov. 26, 2019

(87) PCT Pub. No.: WO2019/013484
PCT Pub. Date: Jan. 17, 2019

(65) Prior Publication Data
US 2020/0106891 A1 Apr. 2, 2020

(30) Foreign Application Priority Data
Jul. 14, 2017 (KR) .................. 10-2017-0089666

(51) Int. Cl.
*H04N 1/00* (2006.01)

(52) U.S. Cl.
CPC ....... *H04N 1/00029* (2013.01); *H04N 1/0001* (2013.01); *H04N 1/00063* (2013.01); *H04N 1/00302* (2013.01); *H04N 1/00474* (2013.01); *H04N 1/00477* (2013.01)

(58) Field of Classification Search
CPC ............ H04N 1/00029; H04N 1/0001; H04N 1/00063; H04N 1/00302; H04N 1/00474; H04N 1/00477; G05B 2219/15018; G05B 2219/21104; G05B 2219/25175; G05B 2219/33182
See application file for complete search history.

(56) References Cited

U.S. PATENT DOCUMENTS

| 5,930,463 | A | * | 7/1999 | Park | H04N 1/00074 358/1.14 |
| 8,035,833 | B2 | * | 10/2011 | Kim | H04N 1/0083 358/1.15 |
| 2003/0227653 | A1 | * | 12/2003 | Jeong | H04N 1/0001 358/437 |

(Continued)

FOREIGN PATENT DOCUMENTS

| CA | 2194815 A1 | 7/1998 |
| CN | 1466370 A | 1/2004 |

(Continued)

*Primary Examiner* — Juan M Guillermety
(74) *Attorney, Agent, or Firm* — Jefferson IP Law, LLP (57) ABSTRACT

A facsimile machine and a self-diagnosis method performed by a facsimile machine are provided. The facsimile machine receives a self-diagnosis execution command, performs self-diagnosis according to the self-diagnosis execution command, and outputs a self-diagnosis result report.

17 Claims, 3 Drawing Sheets

(56) References Cited

U.S. PATENT DOCUMENTS

| | | | | |
|---|---|---|---|---|
| 2005/0111865 A1* | 5/2005 | Kubota | ............. | G03G 15/2039 399/70 |
| 2005/0146743 A1* | 7/2005 | Firooz | ................ | H04N 1/00302 358/1.15 |
| 2005/0268175 A1* | 12/2005 | Park | ...................... | G06F 11/006 714/43 |
| 2007/0247669 A1* | 10/2007 | Iwai | .................. | H04N 1/00244 358/400 |
| 2011/0043850 A1 | 2/2011 | Eun | | |
| 2016/0275379 A1* | 9/2016 | Urasawa | ............ | H04N 1/00477 |

FOREIGN PATENT DOCUMENTS

| | | |
|---|---|---|
| CN | 101442590 A | 5/2009 |
| CN | 106131359 A | 11/2016 |
| KR | 1998-0037905 | 8/1998 |
| KR | 10-2011-0020103 | 3/2011 |

* cited by examiner

| Mode | V.34 | ECM | Speed | Tx Level |
|---|---|---|---|---|
| Normal | Enable | ON | 33.6kbps | -12dB |
| VoIP(Office) | Disable | OFF | 14.4kbps | -15dB |
| Noise(House) | Disable | OFF | 9.6kbps | -9dB |
| Big Noise(Noisy) | Disable | OFF | 4.8kbps | -9dB |

[Fig. 5]

SELF-DIAGNOSIS RESULT REPORT

510 — 1. DIAGNOSIS RESULT

| No | CHECK ITEM | RESULT | DIAGNOSIS GUIDE |
|---|---|---|---|
| 1 | MODEM INTERFACE | OK | 1 |
| 2 | LINE INTERFACE | OK | 1 |
| 3 | LINE VOLTAGE STATE | OK | 1 |
| 4 | DIAL TONE STATE | OK | 1 |
| 5 | CALL SIGNAL STATE | OK | 1 |
| 6 | WHETHER TO PERFORM AUTOMATIC SETTING | OK | GOOD LINE STATE, NORMAL SETTING |

520 — 2. DETAILED DIAGNOSIS INFORMATION
Measured Idle Line Voltage : 52V 530 — 3. AUTOMATIC SETTING INFORMATION
Noise / V.34(Disable) / ECM(Off) / Speed(9.6Kbps) / Tx level(-9)

ent with intervening elements interposed therebetween. In addition, the terms "comprises" and/or "comprising" or "includes" and/or "including" when used in this specification, specify the presence of stated elements, but do not preclude the presence or addition of one or more other elements. In addition, terms such as " . . . unit", " . . . module", or the like refer to units that perform at least one function or operation, and the units may be implemented as hardware or software or as a combination of hardware and software.

FACSIMILE MACHINE INCLUDING MODEM UNIT AND LINE INTERFACE UNIT AND SELF DIAGNOSIS METHOD PERFORMED BY THE SAME

BACKGROUND ART

The disclosure relates to a facsimile machine and a self-diagnosis method performed by the same.

Facsimile (fax) machines are terminals for performing data communication by using a public switched telephone network (PSTN), and thus are office automation equipment that transmit or receive fax data, such as a document and an image, by using a PSTN. Facsimile functionality may be included in a multi-function printer that performs image forming operations, such as printing, copying, faxing, and scanning.

Regarding types of after-service (A/S) of these facsimile machines, a user may bring a facsimile machine to a service center to fix the facsimile machine. Alternatively, an A/S engineer may visit a client to fix a problem of a facsimile machine, which may be more convenient due to the size and weight of the facsimile machine. Also, a user may address a problem of his or her facsimile machine according to a problem-solving method received via a remote diagnosis.

However, users may not address a problem in many cases. Even when an A/S engineer visits a client and addresses a problem, an accurate diagnosis may not be achieved due to low skill of the A/S engineer, and accordingly A/S costs due to a re-placement of a component (for example, a print board) may increase.

DISCLOSURE OF INVENTION

Brief Description of Drawings

The above and other aspects, features, and advantages of certain examples of the present disclosure will be more apparent from the following description taken in con-junction with the accompanying drawings, in which.

MODE FOR THE INVENTION

As used herein, the term "and/or" includes any and all combinations of one or more of the associated listed items. Expressions such as "at least one of," when preceding a list of elements, modify the entire list of elements and do not modify the individual elements of the list.

Various examples now will be described more fully hereinafter with reference to the accompanying drawings. The examples described hereinafter may be modified in many different forms. To more clearly describe features of examples, matters well known to one of ordinary skill in the art to which the below examples pertain will not be described in detail.

Throughout the specification, when an element is referred to as being "connected" or "coupled" to another element, it can be directly connected or coupled to the other element, or can be connected or coupled to the other element with intervening elements interposed therebetween. In addition, the terms "comprises" and/or "comprising" or "includes" and/or "including" when used in this specification, specify the presence of stated elements, but do not preclude the presence or addition of one or more other elements. In addition, terms such as " . . . unit", " . . . module", or the like refer to units that perform at least one function or operation, and the units may be implemented as hardware or software or as a combination of hardware and software.

Figure 1:
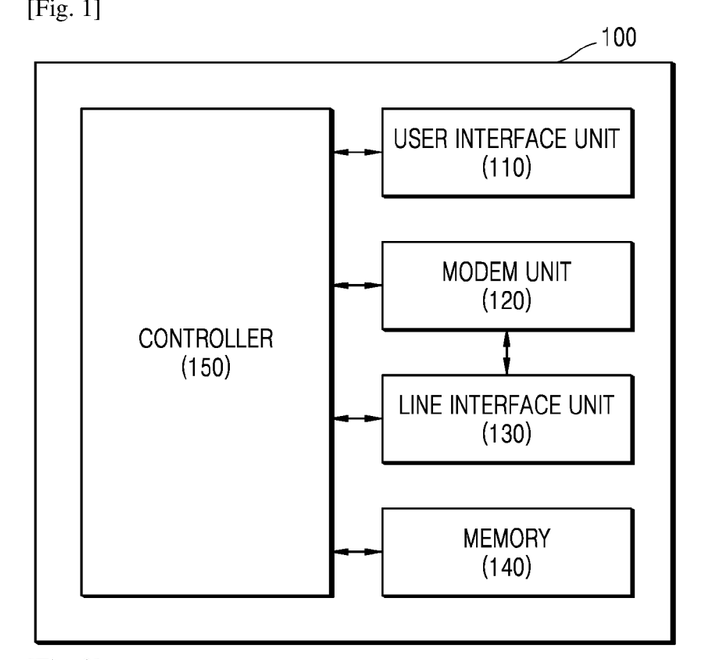
FIG. 1 is a block diagram of a facsimile machine according to an example.

FIG. 1 is a block diagram of a facsimile machine according to an example.

Referring to FIG. 1, a facsimile machine 100 may include a user interface unit 110, a modem unit 120, a line interface unit 130, a memory 140, and a controller 150. Although not shown in FIG. 1, the facsimile machine 100 may further include a power unit for supplying power to the components of the facsimile machine 100.

The user interface unit 110 may include an input unit for receiving an input from a user to perform a function of the facsimile machine 100, such as a self-diagnosis function, and an output unit for providing an output to the user, such as displaying a function execution result of the facsimile machine 100. As an example, the output unit may display a self-diagnosis result report, or information, such as a status of the facsimile machine 100. For example, the user interface unit 110 may include a manipulation panel that receives a user input, and a display panel that displays a screen image.

In more detail, the input unit may be any of devices capable of receiving various types of user inputs, such as a keyboard, a physical button, a touch screen, a camera, a microphone, or the like. The output unit may be a display panel, a speaker, or the like. However, examples are not limited thereto, and the user interface unit 110 may include a device that supports various inputs and outputs.

The modem unit 120 performs a conversion between a digital signal and an analog signal. According to an example, the modem unit 120 converts a digital signal output by the facsimile machine 100 into an analog signal and transmits the analog signal to a telephone line. The modem unit 120 may also receive an analog signal received from the telephone line and convert the received analog signal into a digital signal.

The line interface unit 130 connects the modem unit 120 to the telephone line. According to an example, the line interface unit 130 connects a signal output by the modem unit 120 to the telephone line and inputs a signal received from the telephone line to the modem unit 120. The line interface unit 130 may include a data access arrangement (DAA) for connecting to a public switched telephone network (PSTN).

The memory 140 may install and store programs, such as applications, and various types of data, such as files. According to an example, the memory 140 may store a self-diagnosis program for performing a self-diagnosis of the facsimile machine 100.

The controller 150 may control an overall operation of the facsimile machine 100, and may include at least one processor, such as a central processing unit (CPU). The controller 150 may control the other components included in the facsimile machine 100 to perform an operation corresponding to a user input received via the user interface unit 110.

For example, the controller 150 may access and use data stored in the memory 140 or may store new data in the memory 140. The controller 150 may execute a program installed in the memory 140. According to an example, the controller 150 may execute a self-diagnosis program installed in the memory 140.

The controller 150 may receive a self-diagnosis program execution command via the user interface unit 110, and control the modem unit 120 and the line interface unit 130 to perform a self-diagnosis by executing a self-diagnosis program. Thereafter, the controller 150 may control the user interface unit 110 to output a self-diagnosis result report.

The controller 150 may first determine whether an internal structure of the facsimile machine 100 operates normally. When the controller 150 determines that the internal structure of the facsimile machine 100 operates normally, the controller 150 may determine whether a connection of the facsimile machine 100 to the telephone line is normal.

When the internal structure of the facsimile machine 100 does not operate normally, the facsimile machine 100 is not able to accurately diagnose external environments. Accordingly, only when the internal structure of the facsimile machine 100 operates normally may the controller 150 determine whether the connection of the facsimile machine 100 to the telephone line is normal. According to an example, the controller 150 may obtain a more accurate diagnosis result by first determining whether the internal structure of the facsimile machine 100 operates normally before the controller 150 determines whether the connection of the facsimile machine 100 to the telephone line is normal. However, this determination order is merely an example, and the controller 150 may first determine whether the connection of the facsimile machine 100 to the telephone line is normal. Furthermore, the determination as to whether the connection of the facsimile machine 100 to the telephone line is normal and the determination as to whether the internal structure of the facsimile machine 100 operates normally may be made in parallel.

The controller 150 may determine whether an interface between the controller 150 and the modem unit 120 has been normally established via a data exchange using serial communication. The serial communication may be a serial programming interface (SPI). In more detail, the controller 150 may initialize the modem unit 120, transmit a confirmation signal to the modem unit 120 via serial communication, and receive a response from the modem unit 120 to thereby determine whether an interface between the controller 150 and the modem unit 120 has been normally established.

The controller 150 may determine whether an interface between the modem unit 120 and the line interface unit 130 has been normally connected by using register information of the DAA included in the line interface unit 130. In more detail, the controller 150 may determine whether the interface between the modem unit 120 and the line interface unit 130 has been normally established by reading a register value and determining whether the read register value is a set value.

An example of a process in which the controller 150 determines whether the internal structure of the facsimile machine 100 operates normally has been described above. An example of a process of determining whether the connection of the facsimile machine 100 to the telephone line is normal will now be described.

The controller 150 may determine whether a voltage of the telephone line connected to the line interface unit 130 is in a normal range. In this process, it is determined whether a communication line is normal. The controller 150 may determine whether the voltage of the telephone line connected to the line interface unit 130 is within a normal range by checking whether the voltage of the telephone line connected to the line interface unit 130 enters a typical or a predefined range. At this time, the DAA included in the line interface unit 130 may sense the voltage of the telephone line. As an example, the voltage of a typical telephone line is 20 to 52 V.

The controller 150 may determine whether a dial tone is detected by forming a loop with respect to the facsimile machine 100, the telephone line, and a switchboard. When the dial tone has been detected, the controller 150 may determine whether a frequency of the detected dial tone is located in a normal band. The frequency of the dial tone may differ according to countries. In Korea, the frequency of the dial tone uses an 1100 Hz band.

In this process, it is determined whether or not a communication condition is satisfied. Accordingly, when it is presupposed that the communication line is normal, a more accurate result may be obtained. In other words, when the communication line is abnormal, a dial tone may not be detected, or, even when a dial tone is detected, the detected dial tone may not be normal. Thus, when it is determined that the communication line is normal and then it is determined whether or not the communication condition is satisfied, a more accurate result may be obtained. Accordingly, the controller 150 may first determine whether the voltage of the telephone line connected to the line interface unit 130 is in a normal range, and then, when the voltage of the telephone line is in the normal range, may determine whether the dial tone is detected.

The controller 150 may determine whether an external call signal is detected. As an example, the controller 150 may determine whether the external call signal is detected according to a set ring counter and whether a setting mode enters a reception mode. When a voltage set in the telephone line is sensed, the controller 150 may determine that the external call signal is detected. Typically, when the voltage of a telephone line is 40 to 80 V, it is determined that an external call signal is detected. The controller 150 may determine that a process until the facsimile machine 100 receives data is normally performed by determining whether the external call signal is detected according to the set ring counter and whether a setting mode enters an automatic reception mode for receiving data.

An example of a process in which the controller 150 determines whether the internal structure of the facsimile machine 100 operates normally and an example of a process in which the controller 150 determines whether the connection of the facsimile machine 100 to the telephone line is normal have been described above. An example of a process of outputting a self-diagnosis result report based on a self-diagnosis result will now be described.

After determining whether the internal structure of the facsimile machine 100 operates normally and whether the connection of the facsimile machine 100 to the telephone line is normal, the controller 150 may store a self-diagnosis result in the memory 140 and output the self-diagnosis result via the user interface unit 110. According to an example, when the self-diagnosis result is normal, the controller 150 may control outputting of only a result indicating that a corresponding item in the self-diagnosis result is normal. However, when a specific item is abnormal or an error has occurred as a result of the self-diagnosis, the controller 150 may display an error code for each case and propose respective solutions for the error codes. The solutions may be stored in the memory 140 or may be received from an external apparatus.

According to an example, when a problem occurs in the facsimile machine 100, an accurate diagnosis is possible.

The controller 150 may determine a fax usage environment, based on a usage history of the facsimile machine 100, to determine the type of telephone line, and may set a transmission speed suitable for the fax usage environment according to the determined type of telephone line. The type of telephone line may be determined as one of Norma, VoIP, Noise, and Big Noise, and the transmission speed may be set according to a value preset for each type.

The controller 150 may control the user interface unit 110 to output a self-diagnosis result report including this setting result.

The facsimile machine 100 may further include a communicator (not shown) and a printing unit (not shown).

The communicator may perform wired/wireless communication with another device or network under the control of the controller 150. To this end, the communicator may include a communication module, such as a transceiver, that supports at least one of various wired/wireless communication methods. For example, the communication module may be a chipset.

The wireless communication may include at least one of wireless fidelity (WiFi), WiFi Direct, Bluetooth, ultra-wide band (UWB), and near field communication (NFC). The wired communication may include at least one of a USB and a high definition multimedia interface (HDMI).

The communicator may be connected to an external apparatus outside the facsimile machine 100 and may transmit or receive a signal or data to or from the external apparatus. According to an example, the facsimile machine 100 may transmit the self-diagnosis result report to the external apparatus via the communicator.

The printing unit may output print data under the control of the controller 150. According to an example, the printing unit may output a self-diagnosis result report.

The facsimile machine 100 may include not only the above-described components, but may include various other components for performing the functions of the above-described components.

Figure 2:
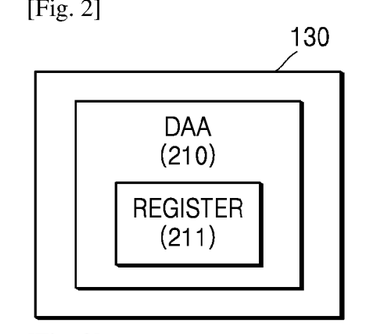
FIG. 2 is a block diagram of a line interface unit according to an example.

FIG. 2 is a block diagram of a line interface unit according to an example.

Referring to FIG. 2, the line interface unit 130 connects the modem unit 120 to the telephone line. To this end, the line interface unit 130 may include a DAA 210 for connecting to a PSTN. The DAA 210 may be connected to the telephone line and may sense, for example, the voltage of the telephone line and the frequency of the dial tone.

The DAA 210 may include a register 211. A value stored in the register 211 may be used to determine whether the interface between the modem unit 120 and the line interface unit 130 has been normally established. In more detail, the controller 150 may determine whether the interface between the modem unit 120 and the line interface unit 130 has been normally established by reading a register value and determining whether the read register value is a set value.

Figure 3:
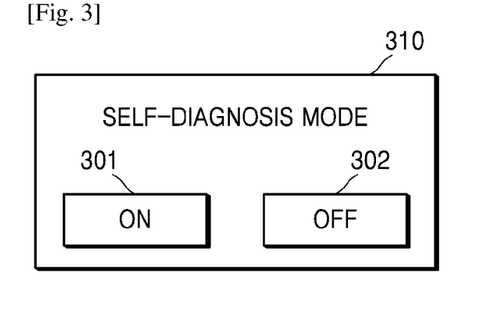
FIG. 3 illustrates a screen image via which a facsimile machine receives a self-diagnosis program execution command according to an example.

FIG. 3 illustrates a screen image via which a facsimile receives a self-diagnosis program execution command according to an example.

Referring to FIG. 3, a user or a service engineer may manipulate the input unit of the facsimile machine 100 to enter a self-diagnosis mode. In more detail, the user or the service engineer may select the self-diagnosis mode from among setting menus displayed on the output unit of the facsimile machine 100. In response to a self-diagnosis mode selection command, the facsimile machine 100 may display, to the output unit, a screen image 310 for receiving the self-diagnosis program execution command. When the screen image 310 for receiving the self-diagnosis program execution command is displayed on the output unit, the user or the service engineer may manipulate the input unit to select an ON field 301 or an OFF field 302, and thus may execute a self-diagnosis program of the facsimile machine 100 or may not execute the self-diagnosis program of the facsimile machine 100 and return to a previous menu.

Figure 4:
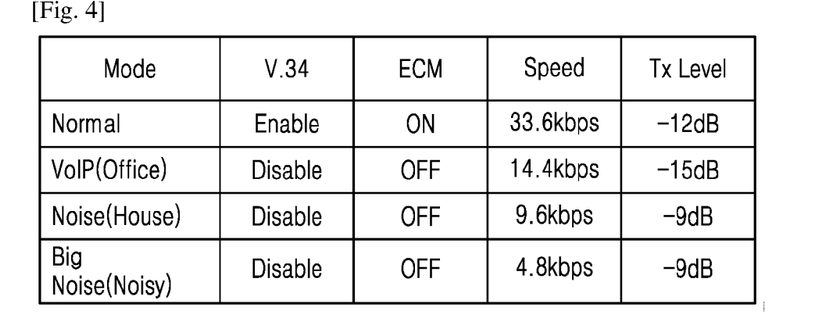
FIG. 4 is a table showing different transmission speed setting values for different line types according to an example.

FIG. 4 is a table showing different transmission speed setting values for different line types according to an example.

Referring to FIG. 4, line types may be set as Normal, VoIP (Office), Noise (House), and Big Noise (Noisy). A used protocol V.34 (Enable/Disable), use or non-use (On/Off) of an error correction mode (ECM), a transmission speed, and a transmission (Tx) level may differ for each line type.

The facsimile machine 100 may determine a fax usage environment based on a usage history and automatically set a line type according to the fax usage environment (automatic setting mode), or may receive a user input via the user interface unit 110 and manually set a line type (manual setting mode).

A result of the setting may be included together with a self-diagnosis result in a self-diagnosis result report and may be output via the user interface unit 110.

Figure 5:
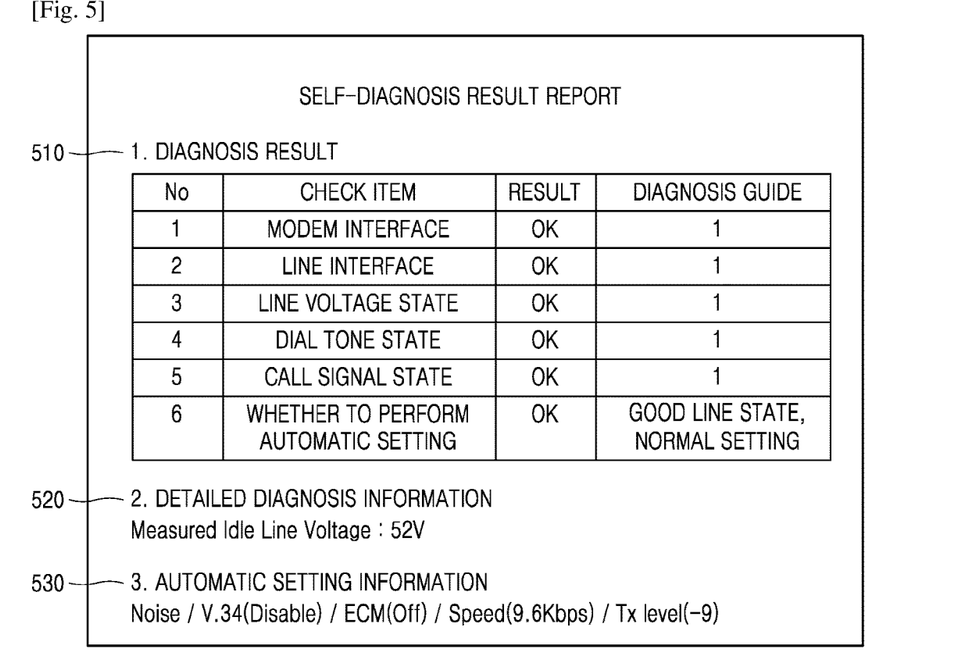
FIG. 5 illustrates a self-diagnosis result report according to an example.

FIG. 5 illustrates a self-diagnosis result report according to an example.

Referring to FIG. 5, the self-diagnosis result report may include a diagnosis result 510, diagnosis information 520, and automatic setting information 530.

The diagnosis result 510 may include, as check items, items regarding a diagnosis result, such as a modem interface, a line interface, a line voltage state, a dial tone state, and a call signal state, and an item regarding whether to perform automatic setting.

The modem interface is an item regarding an interface connection between the controller 150 and the modem unit 120, and the line interface is an item regarding an interface connection between the modem unit 120 and the line interface unit 130. The modem interface item and the line interface item are diagnosis items regarding the internal structure of the facsimile machine 100.

The line voltage state is an item indicating whether the voltage of the telephone line is in a normal range, and the dial tone state is an item indicating whether a dial tone is detected and whether the frequency of the dial tone is located in a normal band when the dial tone is detected. The call signal state is an item indicating whether a call signal is detected and whether a call signal enters a reception mode according to a set ring counter when the call signal is detected. The line voltage state, the dial tone state, and the call signal state are items determining whether the connection of the facsimile machine 100 with the telephone line is normal.

The item regarding whether to perform automatic setting indicates whether to automatically set a line type according to a usage environment.

The diagnosis result 510 may also include a diagnosis guide field. When a self-diagnosis result of a check item is not normal, the diagnosis guide field may display an error code and may also display a solution according to the error code. The diagnosis guide field for the item regarding whether to perform automatic setting may display a line state and a current setting state.

The diagnosis information 520 may include more detailed check contents of the check items. Referring to FIG. 5, the diagnosis information 520 shows that a line voltage was measured to be 52V. Although FIG. 5 illustrates only information about the line voltage, this is merely an example, and other items may be displayed. For example, the diagnosis information 520 may display a specified tone dial frequency, a history of pieces of data transmitted to check an interface between the controller 150 and the modem unit 120, or the like.

The automatic setting information 530 may display contents about a set line type when an automatic setting mode is selected. Referring to FIG. 5, because a type Noise was selected, a protocol V.34 (Disable), an ECM (OFF), a transmission speed (9.6 kbps), and a Tx level (−9) are displayed. However, these items are merely an example, and the contents displayed on the automatic setting information 530 may differ according to selection by a user or a default setting.

Figure 6:
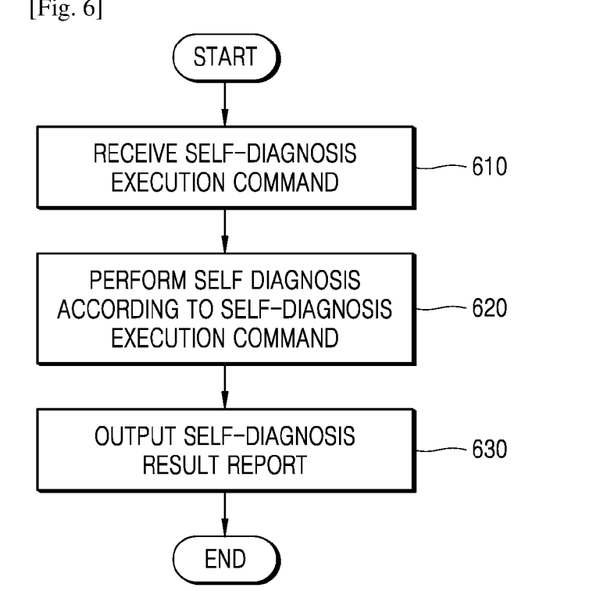
FIG. 6 is a flowchart of a self-diagnosis method performed by a facsimile machine according to an example.

FIG. 6 is a flowchart of a self-diagnosis method performed by a facsimile machine according to an example.

Referring to FIG. 6, the facsimile machine 100 receives a self-diagnosis execution command in operation 610. The facsimile machine 100 may receive a self-diagnosis program execution command via the user interface unit 110.

In operation 620, the facsimile machine 100 performs a self-diagnosis according to the self-diagnosis execution command. The facsimile machine 100 may perform a self-diagnosis via operations of the modem unit 120, the line interface unit 130, and the controller 150. The facsimile machine 100 may first determine whether the internal structure of the facsimile machine 100 operates normally. When the facsimile machine 100 determines whether the internal structure of the facsimile machine 100 operates normally, the facsimile machine 100 may determine whether the connection of the facsimile machine 100 to the telephone line is normal. This will be described below in more detail.

Operation 620 may include an operation of determining whether an interface between the controller 150 and the modem unit 120 has been normally established via a data exchange using serial communication, and an operation of reading a register value of the DAA included in the line interface unit 130 and determining whether the register value is a set value, to thereby determine whether an interface between the modem unit 120 and the line interface unit 130 has been normally established. Operation 620 may also include an operation of determining whether the voltage of the telephone line connected to the line interface unit 130 is in a normal range, and an operation of determining whether a dial tone is detected by forming a loop with respect to the facsimile machine 100, the telephone line, and a switchboard and, when it is determined that the dial tone is detected, determining whether the frequency of the dial tone is located in a normal band. Operation 620 may further include an operation of determining whether an external call signal is detected and determining whether the external call signal is detected according to a set ring counter and enters a reception mode. Operation 620 may further include an operation of determining a fax usage environment, based on a usage history of the facsimile machine 100, to determine the type of telephone line, and setting a transmission speed suitable for the fax usage environment according to the determined type of telephone line.

In operation 630, the facsimile machine 100 outputs a self-diagnosis result report. The facsimile machine 100 may store a self-diagnosis result in the memory 140 and may output the self-diagnosis result via the user interface unit 110 or the printing unit. According to an example, when the self-diagnosis result is normal, the facsimile machine 100 may control outputting of only a result indicating that a corresponding item in the self-diagnosis result report is normal. However, when a specific item is abnormal or an error has occurred as a result of the self-diagnosis, the facsimile machine 100 may display an error code for each case and propose solutions according to the error codes.

Figure 7:
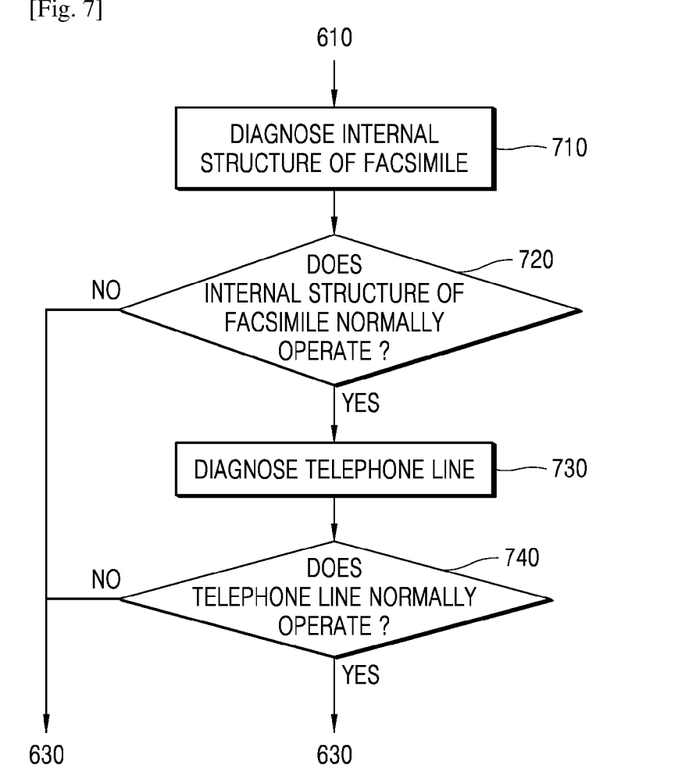
FIG. 7 is a flowchart of a method of performing a self-diagnosis according to an example.

FIG. 7 is a flowchart of a method of performing a self-diagnosis according to an example.

FIG. 7 is a flowchart of operation 620.

Referring to FIG. 7, the facsimile machine 100 diagnoses the internal structure of the facsimile machine 100 in operation 710. Operation 710 includes the operation of determining whether the interface between the controller 150 and the modem unit 120 has been normally established, and the operation of determining whether the interface between the modem unit 120 and the line interface unit 130 has been normally established.

In operation 710, the operation of determining whether the interface between the controller 150 and the modem unit 120 has been normally established, and the operation of determining whether the interface between the modem unit 120 and the line interface unit 130 has been normally established may be sequentially performed for a more accurate diagnosis. However, this is merely an example, and the two operations may be performed in parallel or the determination as to whether the interface between the modem unit 120 and the line interface unit 130 has been normally established may be performed prior to the determination as to whether the interface between the controller 150 and the modem unit 120 has been normally established.

In operation 720, the facsimile machine 100 determines whether the internal structure of the facsimile machine 100 operates normally, based on a result of the diagnosis performed in operation 710. When it is determined in operation 720 that the internal structure of the facsimile machine 100 does not operate normally, the method proceeds to operation 630.

On the other hand, when it is determined in operation 720 that the internal structure of the facsimile machine 100 operates normally, the method proceeds to operation 730 to diagnose whether the telephone line connected to the facsimile machine 100 operates normally. When the internal structure of the facsimile machine 100 is not normal, the facsimile machine 100 is not able to accurately diagnose external environments. Accordingly, only when the internal structure of the facsimile machine 100 operates normally may the facsimile machine 100 determine whether the connection of the facsimile machine 100 to the telephone line is normal.

In operation 730, the facsimile machine 100 diagnoses whether the telephone line connected to the facsimile machine 100 operates normally. Operation 730 includes the operation of determining the voltage of the telephone line connected to the line interface unit 130, the operation of determining the frequency of the dial tone, and the operation of determining whether the external call signal is detected. In operation 730, the operation of determining the voltage of the telephone line connected to the line interface unit 130, the operation of determining the frequency of the dial tone, and the operation of determining whether the external call signal is detected may be sequentially performed for a more accurate diagnosis. However, this is merely an example, and the operations may be performed in parallel or the above-stated order in which the operations are performed may be changed.

In operation 740, the facsimile machine 100 determines whether the telephone line connected to the facsimile machine 100 operates normally. When it is determined in operation 740 that the telephone line connected to the facsimile machine 100 operates normally, the method proceeds to operation 630 to output a self-diagnosis result report indicating that the facsimile machine 100 performs a normal operation. On the other hand, when it is determined in operation 740 that the telephone line connected to the facsimile machine 100 does not operate normally, the method proceeds to operation 630 to output a self-diagnosis result indicating that there is an error.

According to an example, the facsimile machine 100 may obtain a more accurate diagnosis result by first determining whether the internal structure of the facsimile machine 100 operates normally before determining whether the connection of the facsimile machine 100 to the telephone line is normal. However, this determination order is merely an example, and the determination as to whether the connection of the facsimile machine 100 to the telephone line is normal may be first made, or the determination as to whether the connection of the facsimile machine 100 to the telephone line is normal and the determination as to whether the internal structure of the facsimile machine 100 operates normally may be performed in parallel.

The above-described examples may be embodied in the form of a computer-readable recording medium for storing computer executable command languages and data. At least one of the command languages and data may be stored in the form of program codes and, when executed by a processor, may perform a certain operation by generating a certain program module.

The computer-readable recording medium may refer to a magnetic storage medium (e.g., a hard disk) and an optical recording medium (e.g., a CD or a DVD), and may refer to a memory included in a server accessible via a network. For example, the computer-readable recording medium may be the memory 140 of the facsimile machine 100, or may be a memory included in an external apparatus connected to the facsimile machine 100 via a network.

While the present disclosure has been particularly shown and described with reference to examples thereof, it will be understood by those of ordinary skill in the art that various changes in form and details may be made therein without departing from the spirit and scope of the present disclosure as defined by the following claims.

The invention claimed is:

1. A facsimile machine comprising:
a user interface unit;
a modem unit;
a line interface unit to connect the modem unit to a telephone line;
a memory storing a self-diagnosis program; and
a controller to: receive a self-diagnosis program execution command via the user interface unit,
by executing the self-diagnosis program, control the modem unit and the line interface unit to perform self-diagnosis by determining whether a modem unit interface operates normally and, when it is determined that the modem unit interface operates normally, by determining whether a connection of the facsimile machine to the telephone line is normal, and
control the user interface unit to output a self-diagnosis result report,
wherein the line interface unit comprises a data access arrangement for connecting to a public switched telephone network (PSTN).

2. The facsimile machine of claim 1, wherein the controller determines whether an interface between the controller and the modem unit has been normally established via a data exchange using serial communication.

3. The facsimile machine of claim 1,
wherein the controller determines whether an interface between the modem unit and the line interface unit has been normally connected by reading a register value of the data access arrangement and determining whether the register value is a set value.

4. The facsimile machine of claim 1, wherein the controller determines whether a voltage of the telephone line connected to the line interface unit is within a normal range.

5. The facsimile machine of claim 1, wherein the controller:
determines whether a dial tone is detected by forming a loop with respect to the facsimile machine, the telephone line, and a switchboard, and
when it is determined that the dial tone is detected, determines whether a frequency of the dial tone is located in a normal band.

6. The facsimile machine of claim 1, wherein the controller determines whether an external call signal is detected according to a set ring counter and whether a setting mode enters a reception mode.

7. The facsimile machine of claim 1, wherein the controller:
determines a type of the telephone line by determining a fax usage environment based on a usage history of the facsimile machine, and
sets a transmission speed suitable for the fax usage environment according to the determined type of the telephone line.

8. The facsimile machine of claim 1, further comprising a printing unit,
wherein the controller controls the printing unit to output the self-diagnosis result report.

9. A self-diagnosis method performed by a facsimile machine, the self-diagnosis method comprising:
receiving a self-diagnosis execution command;
performing self-diagnosis according to the self-diagnosis execution command by determining whether a modem unit interface operates normally and determining whether a connection of the facsimile machine to a telephone line is normal when it is determined that the modem unit interface operates normally; and
outputting a self-diagnosis result report,
wherein the facsimile machine includes a line interface unit that comprises a data access arrangement for connecting to a public switched telephone network (PSTN).

10. The self-diagnosis method of claim 9, wherein the performing of the self-diagnosis according to the self-diagnosis execution command further comprises determining whether an interface between a controller and a modem unit has been normally connected via a data exchange using serial communication.

11. The self-diagnosis method of claim 9, wherein the performing of the self-diagnosis according to the self-diagnosis execution command further comprises:
reading a register value of the data access arrangement included in the line interface unit; and determining whether an interface between a modem unit and the line interface unit has been normally established by determining whether the register value is a set value.

12. The self-diagnosis method of claim 9, wherein the performing of the self-diagnosis according to the self-diagnosis execution command further comprises determining whether a voltage of a telephone line connected to the line interface unit is within a normal range.

13. The self-diagnosis method of claim 9, wherein the performing of the self-diagnosis according to the self-diagnosis execution command further comprises:
    determining whether a dial tone is detected by forming a loop with respect to the facsimile machine, a telephone line, and a switchboard; and
    when it is determined that the dial tone is detected, determining whether a frequency of the dial tone is located in a normal band.

14. The self-diagnosis method of claim 9, wherein the performing of the self-diagnosis according to the self-diagnosis execution command further comprises:
    determining whether an external call signal is detected according to a set ring counter and whether a setting mode enters a reception mode.

15. The self-diagnosis method of claim 9, wherein the performing of the self-diagnosis according to the self-diagnosis execution command further comprises:
    determining a type of the telephone line by determining a fax usage environment based on a usage history of the facsimile machine; and
    setting a transmission speed suitable for the fax usage environment according to the determined type of the telephone line.

16. The self-diagnosis method of claim 9, wherein the outputting of the self-diagnosis result report comprises printing out the self-diagnosis result report.

17. A non-transitory computer-readable recording medium having instructions recorded thereon for a self-diagnosis method performed by a facsimile machine, the non-transitory computer-readable recording medium comprising:
    instructions for receiving a self-diagnosis execution command;
    instructions for performing self-diagnosis according to the self-diagnosis execution command by determining whether a modem unit interface operates normally and determining whether a connection of the facsimile machine to a telephone line is normal when it is determined that the modem unit interface operates normally; and
    instructions for outputting a self-diagnosis result report,
    wherein the facsimile machine includes a line interface unit that comprises a data access arrangement for connecting to a public switched telephone network (PSTN).

* * * * *